Oct. 6, 1925.
C. G. WOOD
FRICTION CLUTCH
Filed June 9, 1922
1,556,277
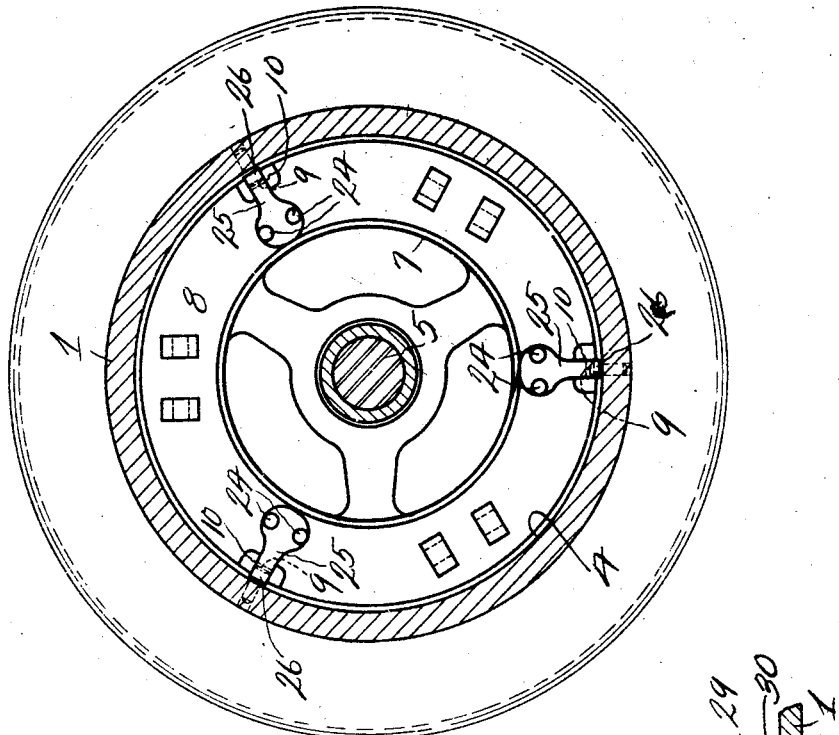
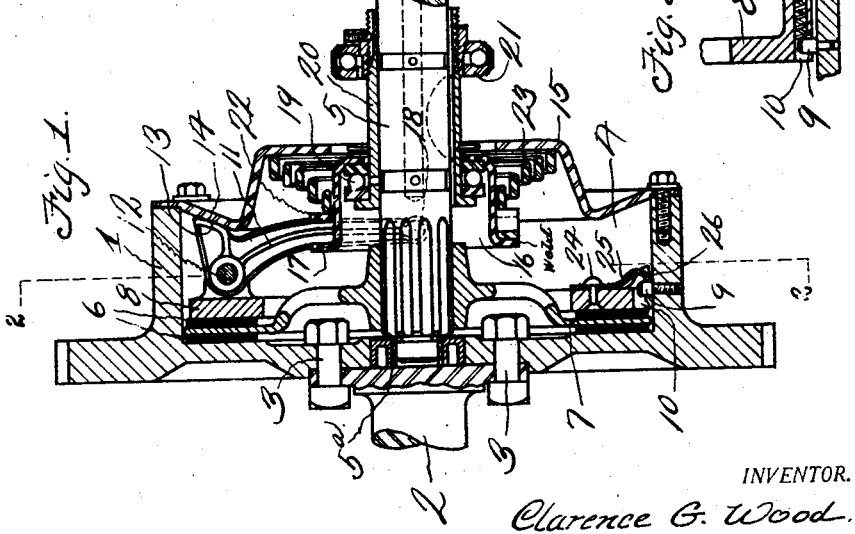
INVENTOR.
Clarence G. Wood.
BY
ATTORNEY.

Patented Oct. 6, 1925.

1,556,277

UNITED STATES PATENT OFFICE.

CLARENCE G. WOOD, OF MUNCIE, INDIANA.

FRICTION CLUTCH.

Application filed June 9, 1922. Serial No. 567,108.

*To all whom it may concern:*

Be it known that I, CLARENCE G. WOOD, a citizen of the United States, residing at Muncie, in the county of Delaware and State of Indiana, have invented certain new and useful Improvements in Friction Clutches, of which the following is a specification.

The invention relates to clutches of the disc type wherein the discs and mats are forced into frictional engagement with the clutch casing and with each other by a thrust ring controlled by angular shaped levers cooperating with the cam surface and guidable in its movement by lugs, and has for its object to provide spring means carried by the thrust ring whereby said thrust ring will be quickly moved out of operative position during a declutching operation. The springs are particularly effective where heavy oil is used in the clutch, as there is a tendency for the clutch plate to adhere to the friction mat for a short time after the declutching operation and consequently cause a clashing of gearing, for instance transmission gears operated through the clutch. Another object is to position said springs where they will cooperate with the thrust ring guide lugs and force said thrust ring outwardly from the adjacent friction mat and hold the thrust ring in declutched position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a vertical longitudinal sectional view through the clutch showing the springs applied to the thrust ring.

Figure 2 is a vertical transverse sectional view through the clutch taken on line 2—2 of Figure 1.

Figure 3 is a detail sectional view through a portion of the casing flange and the thrust ring, showing a modified form of spring cooperating with the guide lug.

Referring to the drawing, the numeral 1 designates the clutch casing and 2 a driving shaft connected thereto by means of bolts 3. Extending axially into the chamber 4 of the clutch casing is a driven shaft 5, which has a bearing 5ª in the casing 1. Disposed within the chamber 4 of the casing 1 are spaced friction mats 6 between which the disc 7 carried by the driven shaft 5 is disposed and adapted to be forced into frictional engagement therewith. Disposed adjacent the outer mat 6 is a thrust ring 8, which thrust ring is guided in its inward and outward movement by means of guide lugs 9 disposed in recesses 10 in the outer periphery of the thrust ring. The thrust ring 8 is forced inwardly by means of clamping levers 11 which are pivoted at 12 to the thrust ring and are provided with camming surfaces 13, which engage a conical surface 14 carried by the cover plate 15 of the casing 1. The clamping levers 11 are rocked on their pivotal points 12 by means of a channeled collar 16, with the channel 17 of which lugs 18 carried by the levers cooperate. The collar 16 has an anti-frictional bearing connection 19 with the clutch controlling sleeve 20, which may be controlled in any suitable manner and preferably by a lever, not shown, one end of which may cooperate with the member 21 carried by the sleeve 20. Interposed between the flange 22 of the collar 16 and the inner side of the cover plate 15 is a helical spring 23, which normally forces the collar 16 inwardly and moves the clamping levers 11 in such a manner as to force the thrust ring 8 inwardly to clutching position. It has been found that on a declutching operation that the outward movement of the thrust ring 8 is retarded, for instance where oil is used within the clutch, and that to prevent a tendency for the plate to adhere to the friction mat 6 for a short time, and thus cause a clashing of the transmission gears when shifting that spring means will overcome the difficulty. Secured at 24 to the thrust ring 8 at spaced points are leaf springs 25, which springs curve outwardly and inwardly and have their ends 26 in engagement with the guide lugs 9. Therefore it will be seen that when the levers 11 are moved during a declutching operation that the springs 25 which have been previously flexed during a clutching operation will instantly move the thrust ring 8 outwardly and overcome the tendency to adhere to the adjacent friction mat 6, especially when oil is used within the clutch.

Referring to Figure 3 wherein a modified form of spring means for controlling the outward movement of the thrust ring 8 is provided, it will be seen that a coiled spring 29 is disposed in a recess 30 extending transversely in relation to the thrust ring, which coiled spring cooperates with the guide lug 9 carried by the casing 1. The action of the spring in the modified form is substantially the same as that shown in Figure 1.

From the above it will be seen that spring means is provided whereby upon a declutching operation the outward movement of the thrust ring 8 will be instantaneous and positive, thereby overcoming any tendency of the thrust ring to adhere to the adjacent friction mat.

The invention having been set forth what is claimed as new and useful is:—

The combination with a disc clutch disposed within a casing, a thrust ring, an adjacent member with which the thrust ring cooperates, said thrust ring being guidable by lugs carried by the casing and disposed within recesses in the thrust ring, of means for moving said thrust ring instantaneously out of engagement with the adjacent member upon a declutching operation, said means comprising leaf springs secured to the outer side of the thrust ring, said leaf springs curving radially outwardly, and inwardly and cooperating with the outer sides of the lugs.

In testimony whereof I affix my signature.

CLARENCE G. WOOD.